US011438037B2

(12) United States Patent
Duxbury et al.

(10) Patent No.: US 11,438,037 B2
(45) Date of Patent: Sep. 6, 2022

(54) TRANSMUTABLE MIMO WIRELESS TRANSCEIVER

(71) Applicant: SEMICONDUCTOR COMPONENTS INDUSTRIES, LLC, Phoenix, AZ (US)

(72) Inventors: Simon Duxbury, Piedmont, CA (US); Abhishek Kumar Agrawal, Fremont, CA (US); Saied Ansari, Oakland, CA (US); Didier Margairaz, San Jose, CA (US); Hongping Liu, Milpitas, CA (US)

(73) Assignee: QUANTENNA COMMUNICATIONS, INC., San Jose, CA (US)

( * ) Notice: Subject to any disclaimer, the term of this patent is extended or adjusted under 35 U.S.C. 154(b) by 0 days.

(21) Appl. No.: 17/126,462

(22) Filed: Dec. 18, 2020

(65) Prior Publication Data

US 2021/0143872 A1 May 13, 2021

Related U.S. Application Data

(63) Continuation of application No. 16/374,589, filed on Apr. 3, 2019, now Pat. No. 10,917,147, which is a (Continued)

(51) Int. Cl.
*H04B 7/0452* (2017.01)
*H04L 25/03* (2006.01)
(Continued)

(52) U.S. Cl.
CPC ......... *H04B 7/0452* (2013.01); *H04B 7/0689* (2013.01); *H04B 7/0871* (2013.01);
(Continued)

(58) Field of Classification Search
CPC ... H04B 7/0413; H04B 7/0452; H04W 84/12; H04L 25/03019
See application file for complete search history.

(56) References Cited

U.S. PATENT DOCUMENTS 8,289,910 B2 * 10/2012 Gabriel .................. H01Q 1/246
370/329
8,483,200 B2 7/2013 Cha et al.
(Continued)

OTHER PUBLICATIONS

European Patent Office: International Search Report and Written Opinion dated Sep. 24, 2019; issued in Application No. PCT/US2019/033128; 17pages.

*Primary Examiner* — Robert C Scheibel
(74) *Attorney, Agent, or Firm* — Maschoff Brennan

(57) ABSTRACT

A multiple-input multiple-output (MIMO) wireless transceiver with "N" transmit and receive chains and a bandwidth evaluation circuit, a chain partitioning circuit and a switchable radio frequency 'RF' filter bank. The bandwidth evaluation circuit evaluates both the utilization of the WLAN(s) and any remaining communications channels and determines whether to operate the MIMO chains synchronously as a single radio or asynchronously as multiple radios. The chain partitioning circuit either partitions subsets of the MIMO chains for asynchronous operation as distinct radios or combines all MIMO chains for synchronous operation as a single radio. The switchable RF filter bank is responsive to a partitioning of subsets of the chains into distinct radios to add RF filters to a RF portion of the chains to isolate each radio from one another, and responsive to a combining of all MIMO chains into a single radio to remove all RF filters.

20 Claims, 4 Drawing Sheets

Related U.S. Application Data continuation of application No. 15/995,104, filed on May 31, 2018, now Pat. No. 10,298,299.

(51) Int. Cl.
  *H04W 84/12* (2009.01)
  *H04W 72/08* (2009.01)
  *H04L 5/00* (2006.01)
  *H04L 27/26* (2006.01)
  *H04B 7/06* (2006.01)
  *H04B 7/08* (2006.01)

(52) U.S. Cl.
  CPC ...... *H04L 5/0023* (2013.01); *H04L 25/03057* (2013.01); *H04L 27/26* (2013.01); *H04W 72/082* (2013.01); *H04L 2025/03426* (2013.01); *H04W 84/12* (2013.01)

(56) References Cited

U.S. PATENT DOCUMENTS

| | | |
|---|---|---|
| 8,891,464 B2 | 11/2014 | Picker |
| 9,319,257 B2 | 4/2016 | Campos et al. |
| 9,496,932 B1 | 11/2016 | Prendergast et al. |
| 11,005,194 B1 * | 5/2021 | Frigon ................ H01Q 21/065 |
| 2005/0193419 A1 | 9/2005 | Lindstrom et al. |
| 2008/0014892 A1 | 1/2008 | Aldana |
| 2012/0120998 A1 * | 5/2012 | Fakhrai ............... H04B 7/0689 |
| | | 375/224 |
| 2013/0025910 A1 | 1/2013 | Englund et al. |
| 2013/0039355 A1 | 2/2013 | de la Garrigue |
| 2013/0336242 A1 | 12/2013 | Rajagopal et al. |
| 2015/0110049 A1 | 4/2015 | Pabla |
| 2017/0005639 A1 * | 1/2017 | Khlat ..................... H03H 7/465 |
| 2018/0234141 A1 | 8/2018 | Silverman et al. |
| 2019/0306805 A1 * | 10/2019 | Hasnain ............... H04B 1/0064 |
| 2021/0021312 A1 * | 1/2021 | Zhou ..................... H04W 4/50 |

* cited by examiner

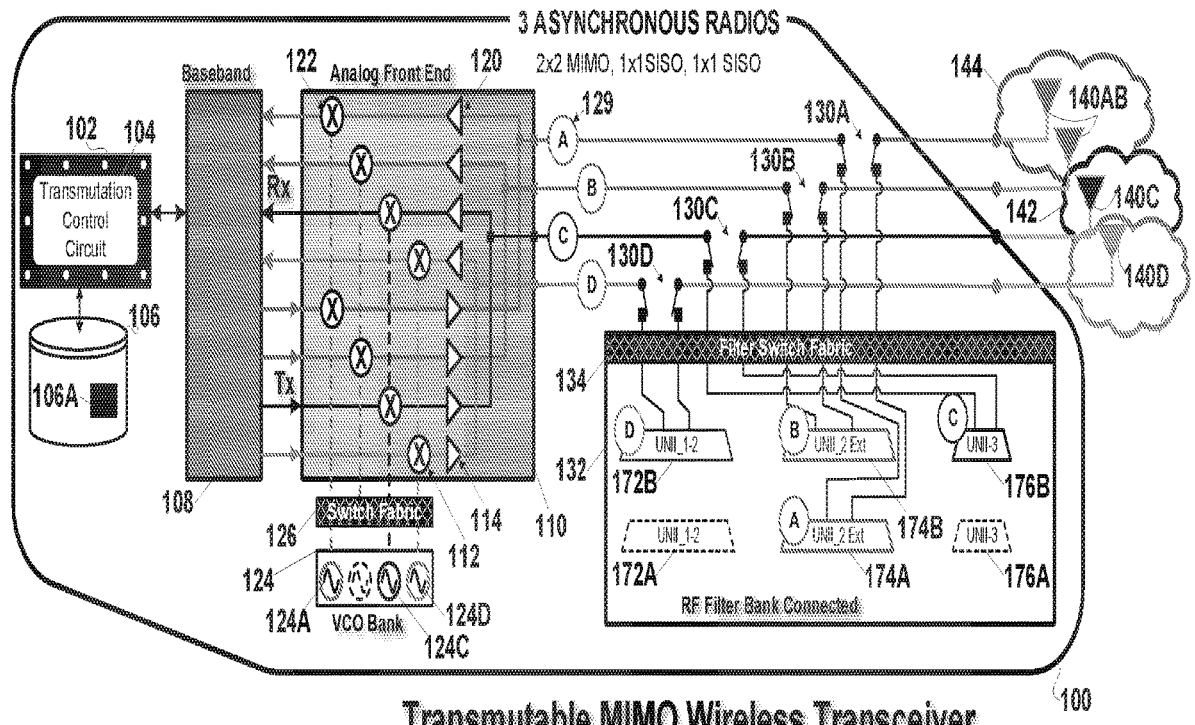
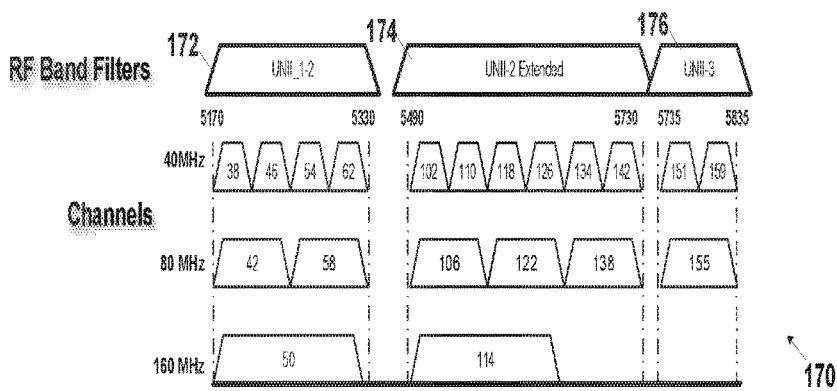
FIG. 1C
FIG. 1D

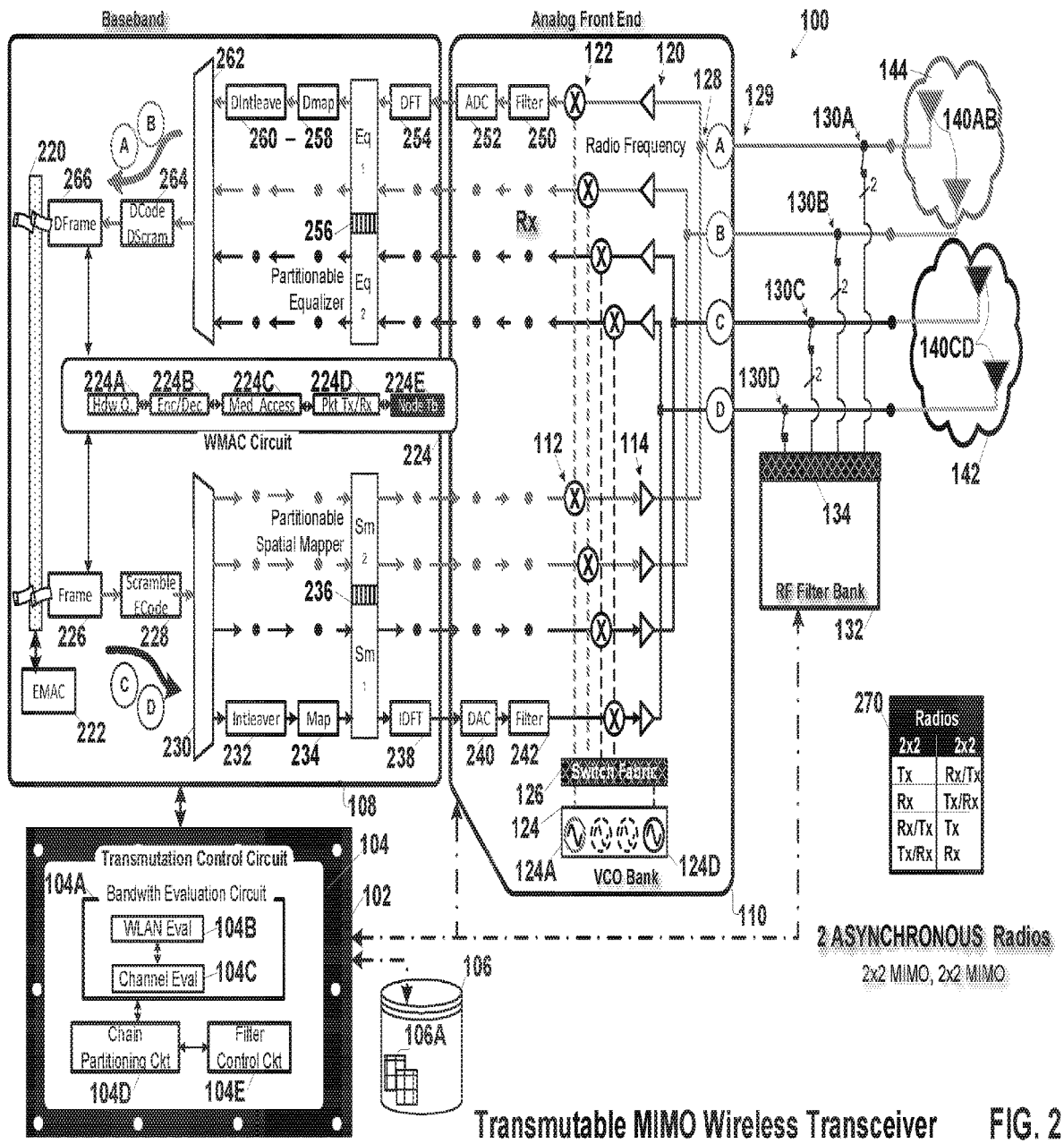
Transmutable MIMO Wireless Transceiver FIG. 2

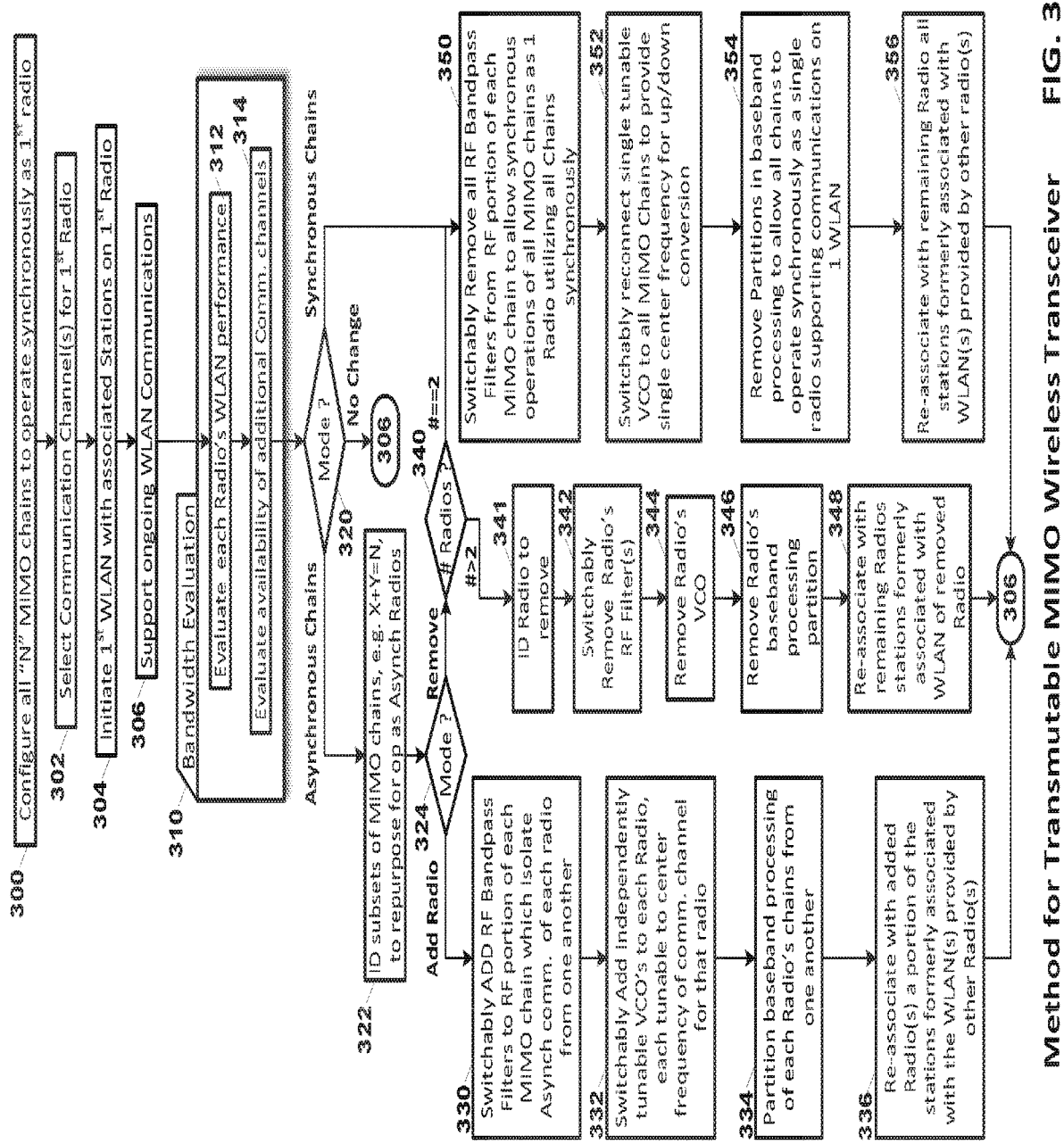
Method for Transmutable MIMO Wireless Transceiver    FIG. 3

TRANSMUTABLE MIMO WIRELESS TRANSCEIVER

BACKGROUND OF THE INVENTION

1. Field of Invention

The field of the present invention relates in general to wireless local area networks including wireless access points (WAP) and wireless stations and specifically multiple-input multiple-output (MIMO) wireless transceivers therefor.

2. Description of the Related Art

Home and office networks, a.k.a. wireless local area networks (WLAN) are established using a device called a Wireless Access Point (WAP). The WAP may include a router. The WAP wirelessly couples all the wireless stations on the WLAN to one another and to the Internet, through a Cable or Digital subscriber line. Wireless stations include: computers, tablets, cell phones, printers, televisions, digital video (DVD) players and Internet of Things (IoT) clients such as smoke detectors, door locks, etc. Most WAPs implement the IEEE 802.11 standard which is a contention based standard for handling communications among multiple competing stations for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device, a.k.a. station.

After selection of a communication channel(s) for the associated home network, access to the shared communication channel(s) relies on a multiple access methodology identified as Collision Sense Multiple Access (CSMA). Communications on the single communication medium are identified as "simplex" meaning, one communication stream from a single source node to one or more target nodes at one time, with all remaining nodes capable of "listening" to the subject transmission. CSMA provides a distributed random access methodology for sharing a single communication medium. Stations contend for a communication link to the WAP, and avoid collisions with one another when doing so, by initiating a link only when monitored energy levels indicate the medium is available.

With the adoption in the IEEE 802.11n standard of multiple-input multiple-output (MIMO) communications the communications throughput capacity on the 2.4 GHz or 5 GHz communication bands was greatly enhanced with the introduction of 4×4 MIMO communications. MIMO multiplies the capacity of a wireless communication link using multipath propagation between multiple transmit and receive antennas, a.k.a. the MIMO antenna arrays, on the WAP and the station on either end of a communication link.

Starting with the IEEE 802.11ac standard and specifically 'Wave 2' thereof, discrete communications to more than one target node at the same time may take place using what is called Multi-User (MU) MIMO capability of the WAP with up to 8 antennas supporting 8 communication streams, a.k.a. 8×8 MIMO. MU capabilities were added to the standard to enable the WAP to transmit downlink communications to multiple stations concurrently, thereby increasing the time available for discrete MIMO video links to wireless HDTVs, computers tablets and other high throughput wireless devices. The IEEE 802.11ad standard codified support for communications on the 60 GHz band. The IEEE 802.11ax standard expanded MU MIMO capabilities to include concurrent uplinks from two or more stations to the WAP.

What is needed are methods for improving the performance of these MIMO transceivers.

SUMMARY OF THE INVENTION

The present invention provides a method and apparatus for a wireless transceiver having a plurality of components coupled to one another to form "N" multiple-input multiple-output (MIMO) transmit and receive chains supporting wireless communications with associated stations on at least one wireless local area network (WLAN). The wireless transceiver also includes: a bandwidth evaluation circuit, a chain partitioning circuit and a switchable radio frequency 'RF' filter bank. The bandwidth evaluation circuit evaluates both the utilization of the at least one WLAN together with any remaining communications channels not utilized by the at least one WLAN and determines based on the evaluation whether to operate the MIMO chains synchronously as a single radio or asynchronously as multiple radios. The chain partitioning circuit either partitions subsets of the MIMO chains for asynchronous operation as distinct radios each supporting their own WLAN or combines all MIMO chains for synchronous operation as a single radio supporting communications on a single WLAN based on the determination by the bandwidth evaluation circuit. The switchable RF filter bank is responsive to a partitioning of subsets of the chains into distinct radios by the chain partitioning circuit to switchably add RF filters to a RF portion of the transmit and receive chains to isolate the asynchronous transmit and receive communications on each radio from one another, and further responsive to a combining of all MIMO chains into a single radio by the chain partitioning circuit to remove all RF filters from the RF portion of the transmit and receive chains to allow synchronous operation thereof.

The invention may be implemented in hardware, firmware or software.

Associated methods and circuits are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-C & 1D are respectively system views and a representative bandplan of a transmutable MIMO wireless transceiver in accordance with an embodiment of the invention;

FIG. 2 is a detailed hardware block diagram of the transmutable MIMO wireless transceiver shown in FIGS. 1A-C; and FIG. 3 is a process flow diagram of processes associated with operating the transmutable MIMO wireless transceiver.

DETAILED DESCRIPTION OF THE EMBODIMENTS

Figure 1B:
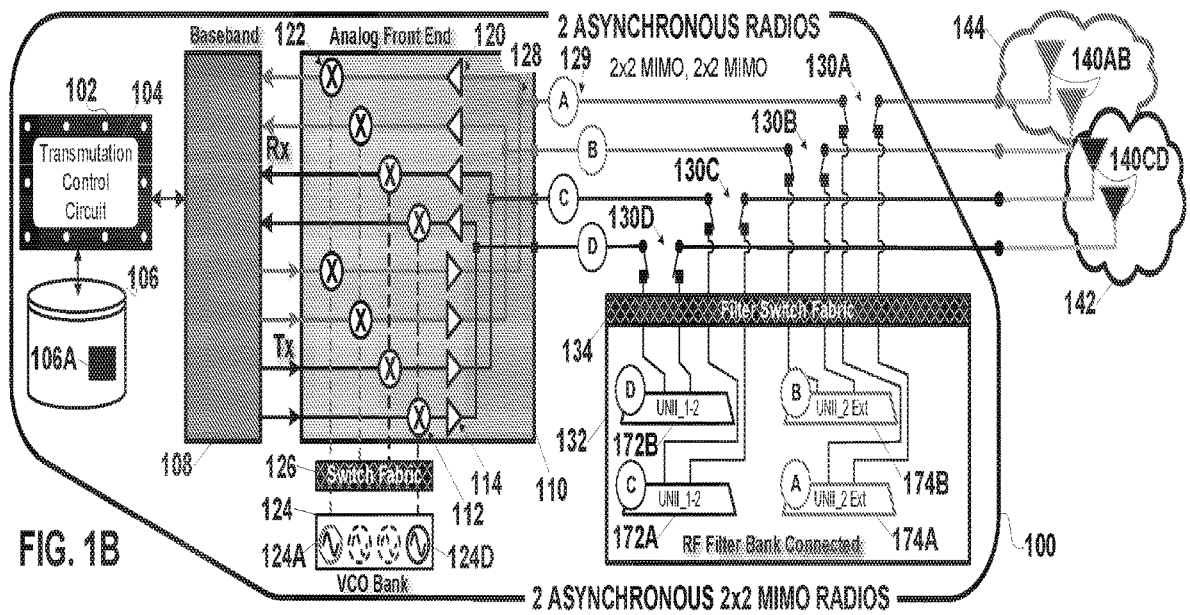
Figure 1A:
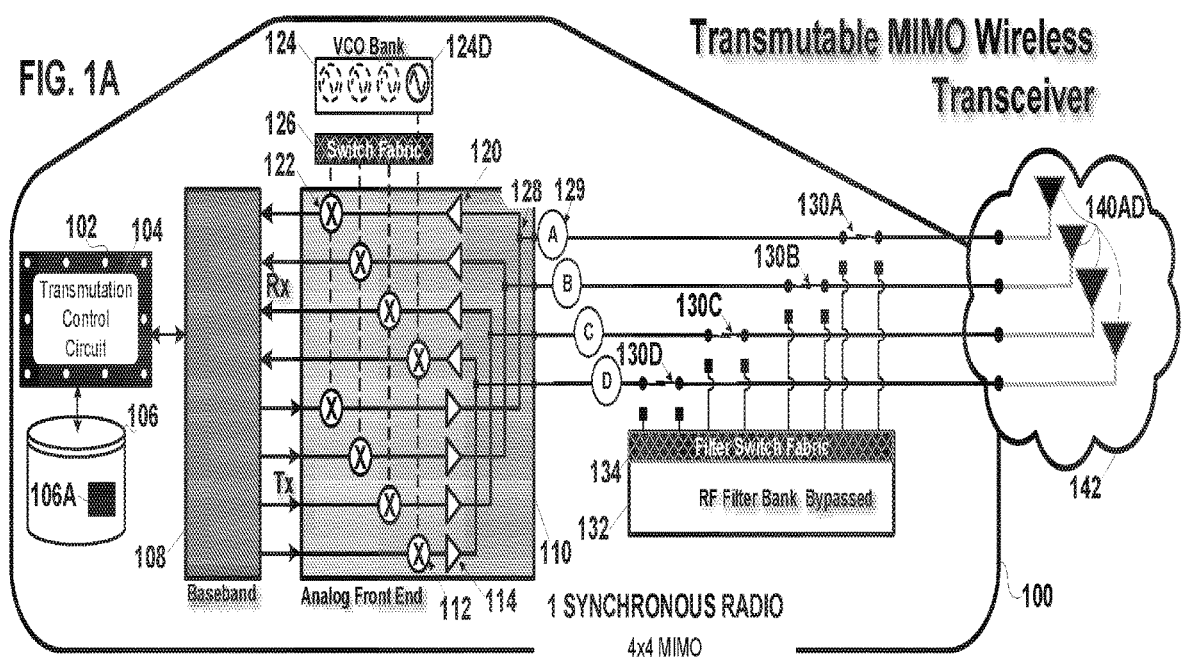

FIGS. 1A-C & 1D are respectively system views and a representative bandplan of a representative transmutable multiple-input multiple-output (MIMO) wireless transceiver in accordance with an embodiment of the invention. FIGS. 1A-C show 3 different transmutations of the wireless transceiver as respectively: one 4×4 MIMO radio; two 2×2

MIMO radios; and three radios, i.e. a 2×2 MIMO radio and two 1×1 single-input single-output (SISO) radios.

FIG. 1A is a system view of the transmutable MIMO wireless transceiver operating all 4 chains synchronously as a single 4×4 MIMO radio on without any radio frequency (RF) filters in the RF portion of the transmit and receive chains, i.e. the RF portion of the analog front end. In other words, the single 4×4 MIMO radio comprising all Tx/Rx chains 129A-D coupled to antennas 140A-D respectively provides WLAN 142 to associated stations (not shown). The transmutable radio in this embodiment of the invention operates on the 5 GHz bandplan proscribed by the IEEE 802.11ac standard and shown in FIG. 1D, and specifically on one or more of the channels thereof, e.g. the 160 Mhz channel 50, reference 172. The transmutable MIMO wireless transceiver includes: a baseband circuit 108, an analog front end (AFE) circuit 110, a switchable RF filter bank 132, and a transmutation control circuit 104. The baseband circuit couples to the AFE circuit to provide digital processing of the transmitted and received downlink and uplink communications on all 4 MIMO chains 129A-D between the transceiver and its associated stations on WLAN 142. The AFE includes on each of its 4 transmit chains, a corresponding one of four upconverters 112 each coupled to a corresponding one of four power amplifiers 114. The AFE includes on each of its 4 receive chains, a corresponding one of four downconverters 122 each coupled to a corresponding low noise amplifier (LNA) 120. The upconverter and downconverter for each transmit and receive chain is coupled via switch fabric 126 to a voltage-controlled oscillator (VCO) bank 124. In a 4×4 MIMO radio transmutation all transmit and receive chains and up/down converters couple to a single VCO 124D which is tunable to the center frequency of the selected channel or channels within the 5 GHz bandplan shown in FIG. 1D. In the 4×4 MIMO transmutation of the MIMO wireless transceiver 100 shown in FIG. 1A each transmit and receive chain 129A-D couples directly to a respective one of antennas 140A-D. In other words, the RF filter bank 132 is switchably bypassed by primary filter switches 130A-D on a respective one of the four chains 129A-D. In an embodiment of the invention transmit and receive switches 128 on each chain may switchably couple the transmit and receive chains to the antenna depending on the direction of the communication on the radio, i.e. uplink or downlink. The transmutation control circuit 104 is, in this embodiment of the invention, is instantiated on processor circuit 102 executing program code 106A in non-volatile storage 106 to which the processor is coupled. The transmutation control circuit couples to the baseband 108, AFE 110, VCO switch fabric 126, primary filter switches 130A-D, and RF filter bank to control the transmutation of the wireless MIMO transceiver into the 4×4 MIMO radio shown in FIG. 1A.

FIG. 1B is a system view of the transmutable MIMO wireless transceiver operating two sets of 2 chains each, asynchronously with respect to one another, as two independent 2×2 MIMO radios with RF bandpass filters in the RF portion of the transmit and receive chains of each radio. These RF bandpass filters isolate each of the two radios from one another. These RF filters allow the radios to communicate with their respective associated stations asynchronously, i.e. while one 2×2 radio is transmitting the other 2×2 radio can be either receiving or transmitting without interfering with one another. In the example shown, the $1^{st}$ 2×2 MIMO radio comprising Tx/Rx chains 129A-B coupled to antennas 140A-B respectively provides WLAN 144 to associated stations (not shown). The $2^{nd}$ 2×2 MIMO radio comprising Tx/Rx chains 129C-D coupled to antennas 140C-D respectively provides WLAN 142 to associated stations (not shown). The transmutable radio in this embodiment of the invention also operates on the 5 GHz bandplan shown in FIG. 1D, but in this case the $1^{st}$ radio operates on any of the channels within the UNII 2 Extended portion of the 5 GHz band at frequencies between 5.490-5.730 GHz and the $2^{nd}$ radio operates independently and asynchronously on any of the channels within the UNII 1 and UNII 2 portions of the 5 GHz band at frequencies between 5.170-5.330 GHz. The isolation of the two radios is achieved by the switchable addition of corresponding bandpass filters to the RF portion of the Tx/Rx chains of each radio by the RF filter bank. The baseband circuit couples to the AFE circuit to provides asynchronous processing of the transmitted and received downlink and uplink communications of each radios two MIMO chains each servicing communications on a respective one of the two WLANs 142-144. The upconverter and downconverter for each transmit and receive chain is coupled via switch fabric 126 to a voltage-controlled oscillator (VCO) bank 124. In a dual radio, e.g. 2×2 and 2×2, transmutation the transmit and receive chains and up/down converters of each radio couple to a corresponding one of two VCOs 124A and 124D which are each independently tunable to the center frequency of the distinct selected channel(s) within the portion of the band available to the radio. In the example shown VCO 124A of the $1^{st}$ radio tunes the corresponding up/down converters to the center frequency of any of the channels within the UNII 2 Extended portion of the 5 GHz band and the VCO 124D of the $2^{nd}$ radio tunes the corresponding up/down converters to the center frequency of any of the channels within the UNII 1 and UNII 2 portion of the 5 GHz band. To allow each radio to operate asynchronously with respect to one another, the RF portion of each radio's Tx/Rx chains is coupled to a corresponding set of RF bandpass filters in RF filter bank 132. Primary filter switches 130A-B on chains 129A-B of the $1^{st}$ radio couple respectively to UNII 2 Extended RF bandpass filters 174A-B respectively. Primary filter switches 130C-D on chains 129C-D of the $2^{nd}$ radio couple respectively to UNII 1-2 RF bandpass filters 172A-B respectively. The transmutation control circuit couples to the baseband 108, AFE 110, VCO switch fabric 126, primary filter switches 130A-D, and RF filter bank to control the transmutation of the wireless MIMO transceiver into the two 2×2 MIMO radios shown in FIG. 1B. Specifically, the transmutation control circuit couples VCO 124A and VCO124D to respectively Tx/Rx chains 129A-B and 129CD. The transmutation control circuit also couples the UNII 2 Extended RF bandpass filters 174A-B to the RF portion of the $1^{st}$ radio's chains 129A-B and the UNII 1-2 RF bandpass filters 172A-B to the RF portion of the $2^{nd}$ radio's chains 129C-D. The transmutation control circuit also controls corresponding partitioning in the baseband circuit 108 as will be shown in detail in the following FIG. 2.

In FIG. 1C is a system view of the transmutable MIMO wireless transceiver operating three sets of chains each asynchronously with respect to one another as three independent radios. The $1^{st}$ of the three radios is a 2×2 MIMO radio. The $2^{nd}$ and $3^{rd}$ radios are 1×1 single-input single-output (SISO). Each radio has RF bandpass filters on its chains which isolate each radio from one another. The RF bandpass filters on each radio span distinct portions of the 5 GHz band shown in FIG. 1D. These RF filters allow the radios to communicate with their respective associated stations asynchronously, i.e. while the $1^{st}$ radio is transmitting the $2^{nd}$ and $3^{rd}$ radios can be either receiving or transmitting without interfering with one another. In the example shown, the $1^{st}$ 2×2 MIMO radio comprising Tx/Rx chains 129A-B coupled to antennas 140A-B respectively provides WLAN 144 to associated stations (not shown). The $2^{nd}$ 1×1 SISO radio comprising Tx/Rx chain 129C coupled to antenna 140C provides WLAN 142 to associated stations (not shown). The $3^{rd}$ 1×1 SISO radio comprising Tx/Rx chain 129D coupled to antenna 140D provides WLAN 146 to associated stations (not shown). The transmutable radio in this embodiment of the invention also operates on the 5 GHz bandplan shown in FIG. 1D, but in this case the $1^{st}$ radio operates on the UNII 2 Extended portion of the 5 GHz band; the $2^{nd}$ radio operates on the UNII 3 portion of the 5 GHz band; and the $3^{rd}$ radio operates on the UNII 1-2 portion of the 5 GHz band. The baseband circuit coupled to the AFE circuit provides asynchronous processing of the transmitted and received downlink and uplink communications of each radio's chain(s) each servicing communications on a respective one of the three WLANs 142-146. The upconverter and downconverter for each transmit and receive chain is coupled via switch fabric 126 to the VCO bank 124. In a tri radio, e.g. 2×2, 1×1, 1×1, transmutation the transmit and receive chains and up/down converters of each radio couple to a corresponding one of three VCOs 124A, 124C, and 124D which are each independently tunable to the center frequency of the selected channel(s) for each radio, within the corresponding distinct portions of the 5 GHz band. In the example shown VCO 124A of the $1^{st}$ radio tunes the corresponding up/down converters to the center frequency of any of the channels within the UNII 2 Extended portion of the 5 GHz band. The VCO 124C of the $2^{nd}$ radio tunes the corresponding up/down converters to the center frequency of any of the channels within the UNII 3 portion of the 5 GHz band. The VCO 124D of the $3^{rd}$ radio tunes the corresponding up/down converters to the center frequency of any of the channels within the UNII 1-2 portion of the 5 GHz band. To allow each of the three radios to operate asynchronously with respect to one another, the RF portion of each radio's Tx/Rx chains is coupled to a corresponding set of RF bandpass filter(s) in RF filter bank 132. The filter bank's primary switches 130A-B on chains 129A-B of the $1^{st}$ radio and the filter bank's switch fabric 134 couple those chains to the UNII 2 Extended RF bandpass filters 174A-B respectively. Primary switch 130C on chain 129C of the $2^{nd}$ radio and the filter bank's switch fabric 134 couples that chain to the UNII 3 RF bandpass filter 176B. Primary switch 130D on chain 129D of the $3^{rd}$ radio and the filter bank's switch fabric 134 couples that chain to the UNII 1-2 RF bandpass filter 172B. The transmutation control circuit couples to the baseband 108, AFE 110, VCO switch fabric 126, primary filter switches 130A-D, and RF filter bank to control the transmutation of the wireless MIMO transceiver into the three 2×2, 1×1, 1×1 radios shown in FIG. 10. Specifically the transmutation control circuit couples VCO 124A to Tx/Rx chains 129A-B, VCO 124C to Tx/Rx chain 129C, and VCO 124D to Tx/Rx chain 129D. The transmutation control circuit also couples the RF bandpass filters. In the example shown: UNII 2 Extended RF bandpass filters 174A-B to the RF portion of the $1^{st}$ radio's chains 129A-B; UNII 3 RF bandpass filter 176B to the RF portion of the $2^{nd}$ radio's chain 129C; and UNII 1-2 RF bandpass filter 172B to the RF portion of the $3^{rd}$ radio's chain 129D. The transmutation control circuit also controls corresponding partitioning in the baseband circuit 108 as will be shown in detail in the following FIG. 2. In an alternate embodiment of the invention the RF filters in the filter bank may be high pass and low pass filters with breakpoints between the UNII bands which serve to isolate the communications on one radio from another and without departing from the scope of the claimed invention.

FIG. 1D shows a representative Unlicensed National Information Infrastructure 'UNII' radio band, a.k.a. the 5 GHz band 170, used by IEEE 802.11a devices. In an embodiment of the invention this bandplan is supported by the transmutable MIMO wireless transceiver 100. Bandplan 170 delineates some of the orthogonal frequency division multiplexed (OFDM) channels, specifically: 40 MHz channels, 80 MHz channels, and 160 MHz channels. The channels are referred to as orthogonal frequency division multiplexed (OFDM) with each channel including a number of OFDM sub-channels or tones. The bandplan includes the aforesaid UNII 1-2, UNII 2 Extended, and UNII 3 portions and the distinct 40 MHz, 80 MHz and 160 MHz channels for each.

FIG. 2 is a detailed hardware block diagram of the transmutable MIMO wireless transceiver shown in FIGS. 1A-C and specifically the transmutation where the transceiver forms two 2×2 MIMO radios as also shown in FIG. 1B. The MIMO wireless transceiver 100 may be instantiated on one or more very large scale integrated circuit (VLSI) chips. The MIMO wireless transceiver is identified as a 4×4 (MIMO) WAP supporting as many as 4 discrete communication streams over its MIMO antenna array 140A-D. The transceiver couples to the Internet via an Ethernet medium access control (EMAC) interface 222 over a cable, fiber, or digital subscriber line (DSL) backbone connection (not shown). A packet bus 220 couples the EMAC to the WiFi baseband 108 and analog front end (AFE) circuit 110 including a plurality of components for forming transmit and receive paths/chains for wireless uplink and downlink communications. The MIMO wireless transceiver 100 comprises: the MIMO baseband 108, the AFE, the transmutation control circuit 104, the RF filter bank 132, primary filter switches 130A-D, and antennas 140A-D.

In the baseband portion 108 wireless communications transmitted to or received from each associated user/client/station are processed. The baseband portion is dynamically configurable to support single or multi-user communications with the associated stations. The AFE 110 handles the upconversion on each of transmit chains of wireless transmissions initiated in the baseband. The AFE also handles the downconversion of the signals received on the receive chains and passes them for further processing to the baseband.

TRANSMISSION: The transmit paths/chains include the following discrete and shared components. The WiFi medium access control (WMAC) component 224 includes: hardware queues 224A for each downlink and uplink communication stream; encryption and decryption circuits 224B for encrypting and decrypting the downlink and uplink communication streams; medium access circuit 224C for making the clear channel assessment (CCA) and for making exponential random backoff and re-transmission decisions; and a packet processor circuit 224D for packet processing of the communication streams. The WMAC component has a node table 224E which lists each node/station on the WLAN(s), the station's capabilities, the corresponding encryption key, and the priority associated with its communication traffic.

Each sounding or data packet for wireless transmission, on the transmit chains, to one or more stations is framed in the framer 226. Next each stream is scrambled and encoded in the scrambler and encoder 228 followed by demultiplexing into up to four streams in demultiplexer 230. The demultiplexer operates under control of the transmutation control circuit, placing the communications for each radio on the corresponding transmit chain(s) assigned thereto by the transmutation control circuit. In FIG. 2 the transceiver is shown in the dual 2×2 configuration as discussed above in FIG. 1B. FIG. 2 shows the transmutation of the 4×4 MIMO transceiver into two asynchronous 2×2 MIMO radios. In FIG. 2, the downlink communications of the $2^{nd}$ 2×2 radio are placed on the chains allocated to that radio, i.e. chains 129C-D by the demultiplexer 230. Each stream is then subject to interleaving and mapping in a corresponding one of the interleavers 232 and mappers 234 on the corresponding chains. Next, the downlink transmissions are spatially mapped in the partitionable spatial mapper 236 with a corresponding beamforming matrix, a.k.a. precoding matrix 'Q' (not shown). The spatial mapper is said to be partitionable because it can handle either the spatial mapping of all four transmit chains together when the transceiver operates as a single 4×4 MIMO radio or can be partitioned to independently spatially map the chains allocated to each of the radios.

The partitionable spatial mapper 236 takes M Tx symbols (denoted by vector $X_{M\times1}$) and maps it to a vector $Y_{N\times1}$ which is then transmitted by N allocated Tx chains. This mapping is performed through a matrix $S_{N\times M}$ where matrix coefficients are calculated based on different Tx scenarios.

$$Y_{N\times1}=S_{N\times M}X_{M\times1}$$

Here M is less than or equal to N. In the case of partitionable spatial mapper, a given N×M dimensioned spatial mapper, e.g. 4×4, is partitioned into multiple spatial mappers, e.g. 2×2 and 2×2, with each performing operations as mentioned in above equation but with lower value of M and N. The M and N value for each partitioned spatial mapper is based on the MIMO capability of that radio, e.g. the number of chains allocated to that radio by the transmutation control circuit 104. The spatially mapped streams from the partitionable spatial mapper are input to Inverse Discrete Fourier Transform (IDFT) components 238 on the corresponding chains, e.g. chains 129C-D of the corresponding radio, for conversion from the frequency to the time domain and subsequent transmission on a corresponding one of the transmit chains, e.g. chains 129C-D in the AFE 110. In an embodiment of the invention the partitionable spatial mapper 236 is responsive to the partitioning of the MIMO chains to spatially map transmitted communications on the chains of each radio independently from one another and further responsive to the combining of all MIMO chains into a single radio to spatially map transmitted communications on all the MIMO chains of the single radio together with one another.

The IDFT on each transmit path/chain is coupled to a corresponding one of the transmit path/chain components in the AFE 110. Specifically, each of the IDFTs 238 couples to an associated one of the digital-to-analog converters (DAC) 240 for converting the digital transmission to analog. Next each transmit chain of the subject radio is filtered in filters 242, e.g. bandpass filters, for controlling the channel(s) on which the wireless transmission will take place. After filtration the transmissions are upconverted in upconverters 112 to the center frequency of the selected channel of the 5 Ghz band. Each upconverter is coupled to the voltage-controlled oscillator (VCO) bank 124 for upconverting the transmission to the appropriate center frequency of the selected channel(s). The switch fabric 126 couples the upconverters on the chains allocated to the $1^{st}$ radio to VCO 124A and the upconverters on the chains allocated to the $2^{nd}$ radio to VCO 124D. Next, one or more stages of amplification are provided on each chain by power amplifiers 114. Each power amplifier is either switchably connected to a corresponding one of the antennas 140A-D either directly or through the RF filter bank 132 depending on the transmutation of the transceiver. In the transmutation shown in FIG. 2 the transceiver is operating as dual radios, in which case primary filter switches 130A-B couple the $1^{st}$ radio's chains 129A-B to the UNII 2 Extended bandpass filters in the RF filter bank, and the primary filter switches 130C-D couple the $2^{nd}$ radio's chains 129C-D to the UNII 1-2 bandpass filters in the RF filter bank. Alternately, where the transmutable MIMO wireless transceiver operates as a single 4×4 MIMO radio, the primary filter switches 130A-D bypass the filter bank, and couple each chain's power amplifier 114 directly to a corresponding one of the antennas 140A-B.

RECEPTION: The receive path/chain includes the following discrete and shared components. Received communications on the transceiver's array of MIMO antenna 108 are subject to RF processing including downconversion in the AFE 110. Each antenna 140A-D is either switchably connected to a corresponding one of the low noise amplifiers 120 either directly or through the RF filter bank 132 depending on the transmutation of the transceiver. In the transmutation shown in FIG. 2 the transceiver is operating as dual radios, in which case primary filter switches 130A-B couple the $1^{st}$ radio's chains 129A-B to the UNII 2 Extended bandpass filters in the RF filter bank, and the primary filter switches 130C-D couple the $2^{nd}$ radio's chains 129C-D to the UNII 1-2 bandpass filters in the RF filter bank. Alternately, where the transmutable MIMO wireless transceiver operates as a single 4×4 MIMO radio, the primary filter switches 130A-D bypass the filter bank and couple each chain's antenna directly to a corresponding one of the low noise amplifiers 120. The station uplink received on the antennas 140A-D is amplified in a corresponding one of the low noise amplifiers 120. In the dual radio transmutation shown in FIG. 2 it is possible for one radio, e.g. the $2^{nd}$ radio to transmit, while the other radio, e.g. the $1^{st}$ radio is receiving. In the example shown the $1^{st}$ radio is receiving on chains 129A-B. After amplification the received communications on the $1^{st}$ radio are downconverted in a corresponding one of downconverters 122. The downconverters of the $1^{st}$ radio are coupled via the switch fabric 126 to VCO 124A in VCO Bank 124. The downconverters of the $2^{nd}$ radio are coupled via the switch fabric 126 to VCO 124D in VCO Bank 124. Each chain's received signal is then filtered in a corresponding one of the channel filters 250, e.g. bandpass filters, for controlling the channel(s) on which the wireless reception will take place. Next, the downconverted analog signal on each chain is digitized in a corresponding one of the analog-to-digital converters (ADC) 252.

Receive processing in the baseband stage includes the following discrete and shared components. The digital output from each ADC is passed to a corresponding one of the discrete Fourier transform (DFT) components 254 in the baseband 108 of the MIMO transceiver for conversion from the time to the frequency domain. A partitionable equalizer 256 to mitigate channel impairments, is coupled to the output of the DFT components 254. The equalizer is said to be partitionable because it can equalize the chains allocated to each radio independently from one another. The partitionable equalizer takes input symbols from all receive chains of a radio (denoted by vectorY) and generates equalized symbols (denoted by vectorX) by removing the effect of channel H. In case of a Linear Minimum Mean Square Error 'LMMSE' equalizer, the equalizer uses an equalization matrix W defined as below:

$$W=(H^HH+\sigma^2I)^{-1}H_0^H$$

Here H is channel matrix of dimension N×M (for a receiver with N Rx chains receiving a symbol with M MIMO streams), and $\sigma^2$ denotes Rx noise variance. For this H matrix, W matrix dimension is M×N. Partitionable Equalizer 256 performs the following operation using this equalizer matrix to generate vector X:

$$X_{M \times 1} = W_{M \times N} Y_{N \times 1}$$

Here M is less than or equal to N. In case of partitionable equalizer, the same equalizer circuit is partitioned in multiple equalizers with each performing the operation as mentioned in above equation but with lower values for M and N. The M and N value for each partitioned equalizer is based on the MIMO capability of that radio. In an embodiment of the invention the partitionable equalizer 256 is responsive to the partitioning of the MIMO chains to equalize received communications on the chains of each radio independently from one another and is further responsive to the combining of all MIMO chains into a single radio to equalize received communications on all the MIMO chains of the single radio together with one another.

The received streams at the output of the partitionable equalizer are subject to demapping and deinterleaving in a corresponding one of the demappers 258 and deinterleavers 260. Next the received stream(s) are multiplexed in order of the radio with which they are associated in multiplexer 262 and decoded and descrambled in the decoder and descrambler component 264, followed by de-framing in the deframer 266. In the example shown in FIG. 2 the $1^{st}$ radio is receiving an uplink on chains 129A-B and the corresponding streams are multiplexed by multiplexer 262 and decoded, descrambled and deframed together. The received communication(s) is then passed to the WMAC component 224 where it is decrypted with the decryption circuit 224B and placed in the appropriate upstream hardware queue 224A of the corresponding radio for upload to the Internet. Where the two radios are receiving distinct uplinks concurrently, each radios uplink will be separately processed by the WMAC component.

Table 270 shows the possible transmit and receive scenarios supported by the transmutable MIMO wireless transceiver when operating as two independent asynchronous radios.

The transmutation control circuit 104 is, in this embodiment of the invention, is instantiated on processor circuit 102 executing program code 106A in non-volatile storage 106 to which the processor is coupled. The transmutation control circuit couples to the baseband 108, AFE 110, VCO switch fabric 126, primary filter switches 130A-D, and RF filter bank to control the transmutation of the wireless MIMO transceiver into the two 2×2 MIMO radios shown in FIG. 2. The transmutation control circuit includes a bandwidth evaluation circuit 104A, a chain partitioning circuit 104D and a filter control circuit 104E. The bandwidth evaluation circuit includes both a WLAN evaluation circuit 1048 and a channel evaluation circuit 104C.

The bandwidth evaluation circuit 104A evaluates both the utilization of the WLAN(s) together with any remaining communications channels not utilized by the WLAN(s) provided by the radio(s) and determines based on the evaluation whether to operate the MIMO chains synchronously as a single radio or asynchronously as multiple radios. In an embodiment of the invention the WLAN evaluation circuit 1048 of the bandwidth evaluation circuit evaluates the utilization of the WLAN(s) including per station throughput and capabilities of each associated station. In another embodiment of the invention the channel evaluation circuit 104C of the bandwidth evaluation circuit evaluates the utilization of any remaining communication channels including interference on said remaining channels resulting from either radar or from other wireless transceivers.

The chain partitioning circuit 104D either partitions subsets of the MIMO chains for asynchronous operation as distinct radios each supporting their own WLAN or combines all MIMO chains for synchronous operation as a single radio supporting communications on a single WLAN based on the determination by the bandwidth evaluation circuit. In an embodiment of the invention the chain partitioning circuit determines a number of MIMO chains in the subset of MIMO chains of each distinct radio, based at least on capabilities of the associated stations, e.g. their support for MIMO, the number of their antennas etc.

The switchable radio frequency 'RF' filter bank 132 and primary filter switches 130A-D are responsive to a partitioning of subsets of the chains into distinct radios by the chain partitioning circuit to switchably add RF filters to a RF portion of the transmit and receive chains to isolate the asynchronous transmit and receive communications on each radio from one another, and further responsive to a combining of all MIMO chains into a single radio by the chain partitioning circuit to remove all RF filters from the RF portion of the transmit and receive chains to allow synchronous operation thereof. The switchable RF filter bank in an embodiment of the invention shown in FIG. 1B and FIG. 2 includes a $1^{st}$ set of RF bandpass filters each spanning a $1^{st}$ set of communication channels, e.g. the channels within the UNII 1-2 portion of the 5 GHz bandplan, and a $2^{nd}$ set of RF bandpass filters each spanning a $2^{nd}$ set of communication channels distinct from the $1^{st}$ set, e.g. the UNII 2 Extended portion of the 5 GHz bandplan. The switchable RF filter bank is responsive to the partitioning of subsets of the chains into two distinct radios by the chain partitioning circuit to switchably add one of the $1^{st}$ set of RF bandpass filters to an RF portion of each chain in the subset of chains of one of the two radios and to switchably add one of the $2^{nd}$ set of RF bandpass filters to each chain in the subset of chains of the other of the two radios, to isolate the asynchronous transmit and receive communications on each radio from one another. The switchable RF filter bank is further responsive to the combining of all MIMO chains into a single radio by the chain partitioning circuit to remove the $1^{st}$ and $2^{nd}$ sets of RF bandpass filters from the RF portion of all the MIMO transmit and receive chains to allow synchronous operation thereof.

In an embodiment of the invention the voltage controlled oscillator (VCO) bank 124 containing independently tunable VCOs is switchably connectable via the switch fabric 126 to the transmit and receive chains for selecting a center frequency therefore, and the VCO bank is responsive to the partitioning of the MIMO chains to switchably connect an independently tunable VCO to the transmit and receive chains of each radio and is further responsive to the combining of all MIMO chains to switchably connect a single VCO to all the MIMO chains of the single radio.

In alternate embodiments of the invention the wireless transceiver may operate as: a wireless access point (WAP) transceiver or a MESH transceiver without departing from the scope of the claimed invention.

FIG. 3 is a process flow diagram of processes associated with operating the transmutable MIMO wireless transceiver. Processing begins with the configuration of all "N" MIMO chains to operate synchronously as a single or $1^{st}$ radio in process 300. Next in process 302 the communication channel(s) for the 1$^{st}$ radio is selected. Then in process 304 the 1st radio's WLAN, a.k.a. the 1$^{st}$ WLAN, is initiated with associated stations on the communication channel or channels selected in the prior process. Control then passes to process 306 for ongoing support of ongoing WLAN communications.

Next in the bandwidth evaluation block 310 the following processes are executed. In process 312 the performance of the radio(s) WLAN is evaluated. This includes overall and per link throughput, station capability including MIMO support as well as number of antennas and streams, and station distance or received signal strength indicia (RSSI). Next in process 314 the availability of any additional portions of the communication band(s) on which the radio is capable of operating is determined. This evaluation may involve a determination of interference from radar or from another WLAN as well as available airtime on the various portions of the bandplan, e.g. the UNII portions of the 5 Ghz bandplan. Next control is passed to decision process 320.

In decision process 320 a determination is made as to whether or not to partition the MIMO chains as independent radios operable asynchronously with respect to one another, to re-unify all MIMO chains as a single radio whose chains operate synchronously with respect to one another, or to leave the current transmutation, i.e. the number of radio's, of the transmutable MIMO wireless transceiver unchanged. The determination is based on the bandwidth evaluation block 310. Generally, if there are additional UNII portions of the bandplan that are available it will be advantageous to the transmutable MIMO wireless transceiver's overall throughput to increase the number of radios instantiated by the transmutable MIMO wireless transceiver and vice-versa. Where available bandwidth has decreased marginally and the number of radio's currently instantiated If the determination is made in decision process 320 that based on the evaluation block 310 that the current transmutation of the transmutable MIMO wireless transceiver is acceptable then control returns to process 306.

Alternately, if the determination is made in decision process 320 to continue to instantiate multiple radios operating asynchronously with respect to one another, then control is passed to process 322. In process 322 subsets of the transceiver's MIMO chains, e.g. subsets X and Y, where X+Y=N or subsets X, Y, and Z, where X+Y+Z=N; are identified for repurposing to support the operation of two or more asynchronous radios. The number of subsets identified, and the number of chains allocated to each may be based on the capabilities of the stations and whether the current throughput of the supported WLANs has increased or decreased as determined in process 312. The number of subsets identified may also be based on the presence or absence of additional available portions of the bandplan, e.g. UNII portions of the 5 GHz bandplan. The number of subsets identified may also depend on the number of available bandpass filters.

Next, in decision process 324 a determination is made whether to transmute the MIMO wireless transceiver to add another radio, or to transmute the MIMO wireless transceiver to remove one of the radios.

If a determination is made in decision process 324, to add a radio then control is passed to process 330. In process 330 RF bandpass filters are switchably added to the RF portion of the MIMO chain(s) of each radio, including the MIMO chains of the added radio. These RF filters isolate the asynchronous communications of the radios, e.g. the 1$^{st}$ and 2$^{nd}$ radio, from one another. Next, in process 332 independently tunable VCO's are switchably added to the AFE portion of the chains allocated to each radio, with each VCO tunable to the center frequency of the communication channel for that radio. Control is then passed to process 334 in which the baseband portion of each radio is partitioned to process each radio's MIMO chains independently from one another. Then in process 336 any re-association with the added radio(s) of a portion of the stations formerly associated with the existing WLAN(s) provided by the existing radios is effected. In an embodiment of the invention this may be effected by transmitting an 802.11ac band switch announcement, or an 802.11ad fast session transfer to the station(s) that will be re-associated with the added radio. Control is then returned to process 306.

If a determination is made in decision process 324, to remove a radio then control is passed to decision process 340. In decision process 340 a determination is made as to the number of existing radios. If the number existing is two, then control is passed to process 350 for a transmutation of the MIMI wireless transceiver to a single radio operating all chains synchronously. Alternately, if the determination in decision process 340 is that the number of existing radios is three or more then control is passed to process 341 to initiate the processes of removal of one of the three or more existing radios. In process 341 the radio that will be removed is identified. Next in process 342 the RF filter(s) are switchably removed from the chains of the identified radio. Then in process 344 the identified radio's VCO is switchably removed. Next in process 346 any baseband partitions that were instantiated to support the identified radio are removed. This includes the corresponding partition in the partitionable equalizer and in the partitionable spatial mapper. Then in process 348 any re-association with the remaining radio(s) of the stations formerly associated with the WLAN provided by the radio identified for removal is effected. In an embodiment of the invention this may be effected by transmitting an 802.11ac band switch announcement, or an 802.11ad fast session transfer to the station(s) that will be re-associated with the remaining radios. Control is then returned to process 306.

If, alternately, the determination is made in decision process 320 to return the radio to synchronous operation of all chains, then control is passed to process 350. In process 350 RF bandpass filters are switchably removed from the RF portion of each radio's MIMO chain(s) to allow synchronous operations of all MIMO chains as one radio utilizing all the MIMO chains of the transmutable MIMO wireless transceiver synchronously. Control then passes to process 352 In process 344 a single tunable VCO is switchably reconnected to all MIMO chains to provide tuning of all chains to the center frequency of the communication channel for the radio. Control is then passed to process 354 in which the baseband processing partitions are removed, e.g. the partition(s) in the partitionable spatial mapper and the partitionable equalizer, thereby allowing all chains to operate synchronously as a single radio supporting communications on the WLAN provided by the radio. Then in process 356 any re-association with the single radio, a.k.a. the 1$^{st}$ radio of the stations formerly associated with the WLAN(s) provided by the 2$^{nd}$ or other radios is effected. In an embodiment of the invention this may be effected by transmitting an 802.11ac band switch announcement, or an 802.11ad fast session transfer to the station(s) that will be re-associated with the single remaining radio. Control is then returned to process 306.

In another embodiment of the invention, the return of the transmutable MIMO wireless transceiver to synchronous operation of all chains as a single radio may not be accompanied by the removal of all RF bandpass filters, but rather by switchably adding the same bandpass filters to some or all of the chains.

The components and processes disclosed herein may be implemented singly or in combination by: hardware, circuits, firmware, software, or a processor executing computer program code; coupled to the wireless transceiver's transmit and receive path components, without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A wireless transceiver comprising:
   a plurality of transmit and receive chains configured to support wireless communications on wireless local area networks (WLAN), each of the plurality of transmit and receive chains configured to be coupled to a different one of a plurality of antennas;
   a switchable filter bank configured to switchably add filters to the plurality of transmit and receive chains and to switchably remove filters from the plurality of transmit and receive chains, wherein the coupling between each of the plurality of transmit and receive chains and the different one of the plurality of antennas is maintained when switchably adding and removing filters; and
   a processor configured to perform operations, the operations comprising:
   determine a configuration of the plurality of transmit and receive chains, and
   direct the switchable filter bank to switchably add one or more filters, switchably remove one or more filters, or switchably add one or more filters and switchably remove one or more filters from one or more of the plurality of transmit and receive chains based on the configuration of the plurality of transmit and receive chains, wherein in a first configuration each of the plurality of transmit and receive chains includes a filter and the filters in the first configuration are the same and are configured to filter out one or more frequency channels of a frequency band used in a single WLAN.

2. The wireless transceiver of claim 1, wherein the configuration of the plurality of transmit and receive chains is the first configuration that includes synchronous operation of the plurality of transmit and receive chains as a single radio supporting wireless communications on the single WLAN.

3. The wireless transceiver of claim 1, wherein the configuration of the plurality of transmit and receive chains includes the plurality of transmit and receive chains being partitioned into two or more sets of transmit and receive chains, each set of transmit and receive chains being configured for asynchronous operation as distinct radios each supporting a different WLAN.

4. The wireless transceiver of claim 3, wherein the operations further comprise determine a number of the plurality of transmit and receive chains in each of the two or more sets of transmit and receive chains.

5. The wireless transceiver of claim 1, wherein the configuration of the plurality of transmit and receive chains is determined based on a performance of one or more of the plurality of transmit and receive chains and/or availability of communication bands in which the plurality of transmit and receive chains are configured for operating.

6. The wireless transceiver of claim 5, wherein the availability of communication bands is determined based on at least one of: interference and available airtime.

7. The wireless transceiver of claim 5, wherein the performance is determined based on at least one of: a per link throughput, an overall throughput, a station capability, a station distance, and received signal strength indicia (RSSI).

8. The wireless transceiver of claim 1, operative as a wireless access point WAP transceiver or a MESH transceiver.

9. A method of operating a wireless device, the method comprising:
   determining a configuration of a plurality of transmit and receive chains in a wireless transceiver, the plurality of transmit and receive chains configured to support wireless communications on wireless local area networks (WLAN) and to be coupled to a different one of a plurality of antennas;
   determining a configuration of a switchable filter bank based on the configuration of the plurality of transmit and receive chains; and
   directing the switchable filter bank to switchably add filters, switchably remove filters, or switchably add filters and switchably remove filters from one or more of the plurality of transmit and receive chains based on the configuration of the switchable filter bank, wherein the coupling between each of the plurality of transmit and receive chains and the different one of the plurality of antennas is maintained when switchably adding and removing filters, wherein in a first configuration each of the plurality of transmit and receive chains includes a filter and the filters in the first configuration are the same and are configured to filter out one or more frequency channels of a frequency band used in a single WLAN.

10. The method of claim 9, wherein the configuration of the plurality of transmit and receive chains includes synchronous operation of the plurality of transmit and receive chains as a single radio supporting wireless communications on the single WLAN.

11. The method of claim 9, wherein the configuration of the plurality of transmit and receive chains includes the plurality of transmit and receive chains being partitioned into two or more sets of transmit and receive chains, each set of transmit and receive chains being configured for asynchronous operation as distinct radios each supporting a different WLAN.

12. The method of claim 11, further comprising determining a number of the plurality of transmit and receive chains in each of the two or more sets of transmit and receive chains.

13. The method of claim 9, wherein the configuration of the plurality of transmit and receive chains is determined based on a performance of one or more of the plurality of transmit and receive chains and/or availability of communication bands in which the plurality of transmit and receive chains are configured for operating.

14. The method of claim 13, wherein the availability of communication bands is determined based on at least one of: interference and available airtime.

15. The method of claim 13, wherein the performance is determined based on at least one of: a per link throughput, an overall throughput, a station capability, a station distance, and received signal strength indicia (RSSI).

16. A method comprising:
before initiating a wireless local area network hosted by a wireless transceiver, configuring all of a plurality of transmit and receive chains in the wireless transceiver in a first configuration such that the plurality of transmit and receive chains synchronously operate as a single radio supporting wireless communications on a single WLAN;
after configuring all of the plurality of transmit and receive chains in the wireless transceiver to synchronously operate, directing wireless communications for the wireless local area network over the plurality of transmit and receive chains;
after directing wireless communications, obtaining network factors including a performance of one or more of the plurality of transmit and receive chains and/or availability of communication bands in which the plurality of transmit and receive chains are configured for operating;
selecting an operating configuration of the plurality of transmit and receive chains from a plurality of configurations based on the network factors, the plurality of configurations including the first configuration and at least one second configuration where the plurality of transmit and receive chains are partitioned into two or more sets of transmit and receive chains and each set of transmit and receive chains are configured for asynchronous operation as distinct radios each supporting a different wireless local area network; and
in response to selecting the operating configuration, configuring the plurality of transmit and receive chains in the wireless transceiver based on the operating configuration, wherein in the first configuration each of the plurality of transmit and receive chains includes a filter and the filters in the first configuration are the same and are configured to filter out one or more frequency channels of a frequency band used in the single WLAN.

17. The method of claim 16, wherein configuring the plurality of transmit and receive chains in the wireless transceiver includes switchably adding one or more filters to one or more of the plurality of transmit and receive chains, wherein each of the plurality of transmit and receive chains is configured to be coupled to a different one of a plurality of antennas and the coupling between each of the plurality of transmit and receive chains and the different one of the plurality of antennas is maintained when switchably adding the one or more filters.

18. The method of claim 16, further comprising determining a number of the plurality of transmit and receive chains in each of the two or more sets of transmit and receive chains, wherein the plurality of transmit and receive chains in the wireless transceiver are configured further based on the determined number.

19. The method of claim 16, wherein the availability of communication bands is determined based on at least one of: interference and available airtime.

20. The method of claim 16, wherein the performance is determined based on at least one of: a per link throughput, an overall throughput, a station capability, a station distance, and received signal strength indicia (RSSI).

* * * * *